United States Patent [19]

Marshall

[11] Patent Number: 4,815,627

[45] Date of Patent: Mar. 28, 1989

[54] HIGH PRELOAD QUICK OPERATING CLOSURE

[75] Inventor: James R. Marshall, Penn Hills, Pa.

[73] Assignee: Westinghouse Electric Corp., Pittsburgh, Pa.

[21] Appl. No.: 149,273

[22] Filed: Jan. 28, 1988

[51] Int. Cl.$^4$ .................................................. B65D 45/28
[52] U.S. Cl. .................................... 220/315; 220/316; 220/323
[58] Field of Search ................ 220/315, 316, 323, 211

[56] References Cited

U.S. PATENT DOCUMENTS

| | | | |
|---|---|---|---|
| 2,797,948 | 7/1957 | Tangard | 220/315 X |
| 3,173,572 | 3/1965 | Beecher | 220/315 X |
| 3,539,215 | 11/1970 | Lauterbach | 220/315 X |
| 3,626,961 | 12/1971 | Quinones | 220/315 X |
| 4,053,067 | 10/1977 | Katz et al. | 214/18 |
| 4,099,751 | 7/1978 | Poe et al. | 292/139 |
| 4,102,474 | 7/1978 | Platts | 220/323 |
| 4,159,063 | 6/1979 | Weber et al. | 220/316 |
| 4,307,818 | 12/1981 | Singh et al. | 220/316 |
| 4,450,134 | 5/1984 | Soot et al. | 376/262 |
| 4,467,936 | 8/1984 | Makhijani | 220/316 X |
| 4,519,519 | 5/1985 | Meuschke et al. | 220/211 |
| 4,678,620 | 7/1987 | Marshall et al. | 372/203 |

FOREIGN PATENT DOCUMENTS 1614512  9/1970  Fed. Rep. of Germany ...... 376/203

Primary Examiner—Steven M. Pollard
Attorney, Agent, or Firm—Michael G. Panian

[57] ABSTRACT

A high preload quick operating closure for a pressure vessel (17) comprises a vessel opening or nozzle (19) having a port flange (20) with an upper surface (23), which has a wall (26) affixed thereto, the wall (26) having one or more circumferentially spaced holes (32), the combination of the wall (26) and port flange (20) forming a well (29), and a vessel head (27) forming a closure for the port flange. A plurality of wedge assemblies (30) secured to the wall (26) at holes (32), comprising hydraulically operated cylinders (39) operably connected to wedges (33) which slidably engage a tapered surface (40) of the vessel head (27) creating a larger sealing force between the head (27) and the flange (20) to seal the pressure vessel (17) with an enormous preload. The closure incorporates a control system (50) with two independent safety features to prevent the closure device from opening when the pressure vessel (17) is pressurized.

16 Claims, 2 Drawing Sheets

HIGH PRELOAD QUICK OPERATING CLOSURE

TECHNICAL FIELD

The invention relates to a closure device for a pressure vessel and more particularly to a high preload closure which is capable of quick and remote operation.

BACKGROUND OF THE INVENTION

Certain pressure vessels, especially those used for testing purposes, require that specimens or equipment frequently be placed within, and removed from, the vessel. Entry ports are conventionally sealed by bolting a head onto a port flange with a multitude of bolts. A drip pan is provided beneath the port flange to prevent inadvertent spillage of water or other liquid coolant. The conventional method of opening and closing the port flange is done manually and is very time-consuming, mainly due to the large number of bolts that must be properly torqued to insure a proper seal. Further, due to the pressures within the pressure vessel, which can be up to 21 MPa (3000 pounds per square inch), a relatively very high preload is required to maintain an effective seal. This large preload requires a correspondingly large torque on the bolts in order to adequately press the seal rings of the vessel head against the port flange. Such a system demands exact rotational positioning of the head with respect to the vessel port so that the bolt openings within the head are concentric with a corresponding threaded section within the port. Also, the high torque necessary can lead to over torquing of the bolts and subsequent damage to either the head or the vessel port. Such operations can therefore be very time consuming and costly.

It is sometime desired to open and close the pressure vessel within a short time period. The most desirable device would also be one which is capable of remote operation to totally obviate the need for timeconsuming manual labor. Since the pressure vessel may contain liquid, the closure device should incorporate a drip pan to prevent spillage of any liquid or tive water contained within the vessel.

A hatch assembly having a rapid-action latching mechanism is described in U.S. Pat. No. 4,678,620 of which applicant is a co-inventor and is assigned to the present assignee. The hatch is pressed against the opening by means of a locking bolt having a chamfered surface being forced against a beveled surface of the hatch by a spring-loaded crankshaft arrangement. Although this provides for a relatively quick closing means as compared to a plurality of bolts, it still requires manual operation of a plurality of latching units. Furthermore, since it is a spring-loaded mechanism, it cannot provide the necessary preload required for sealing a pressurized vessel.

Since it is a pressurized vessel, it would be desirable as well to provide an automatic closure mechanism which would prevent the opening of the head while the vessel is still pressurized. This would prevent the possibility of injuring the operating personnel.

It is therefore an object of the present invention to provide a closure mechanism which provides for the quick sealing, opening, loading and unloading of a pressure vessel from a remote location.

It is another object of the present invention to provide a closure mechanism which is capable of providing a very large preload, on the order of about 53 MN to 62 MN (12 to 14 million pounds), on the closure head in order to provide an effective seal for the closure.

It is a further object of the present invention to provide a closure mechanism which incorporates a means to prevent the accidental spillage of contents when the head is removed.

It is a still further object of the present invention to provide a closure mechanism for a pressurized vessel which prevents the unlocking of the vessel head while the vessel is still pressurized.

DISCLOSURE OF THE INVENTION

The above objects are obtained by the present invention, according to which, briefly stated, a high preload quick operating closure includes a circular vessel port flange with an upper surface for receiving a vessel head having a circumferential tapered upper surface slanted downward in a radially outward direction, the head adapted to be received on the upper surface of the port flange in sealing engagement with the port flange. The closure device further comprises at least one wedge assembly secured to the port flange and having a wedge disposed to slidably engage the circumferential tapered upper surface of the vessel head and means for moving the wedge into and out of engagement with the vessel head. Additionally, the closure device has a control system whereby two independent safety features, one electrical and one hydraulic, will prevent opening of the pressure vessel while it is still pressurized.

BRIEF DESCRIPTION OF THE DRAWINGS

The invention will become more apparent by reading the following detailed description in conjunction with the drawings, which are shown by way of example only, wherein.

DESCRIPTION OF THE PREFERRED EMBODIMENT

Figure 1:
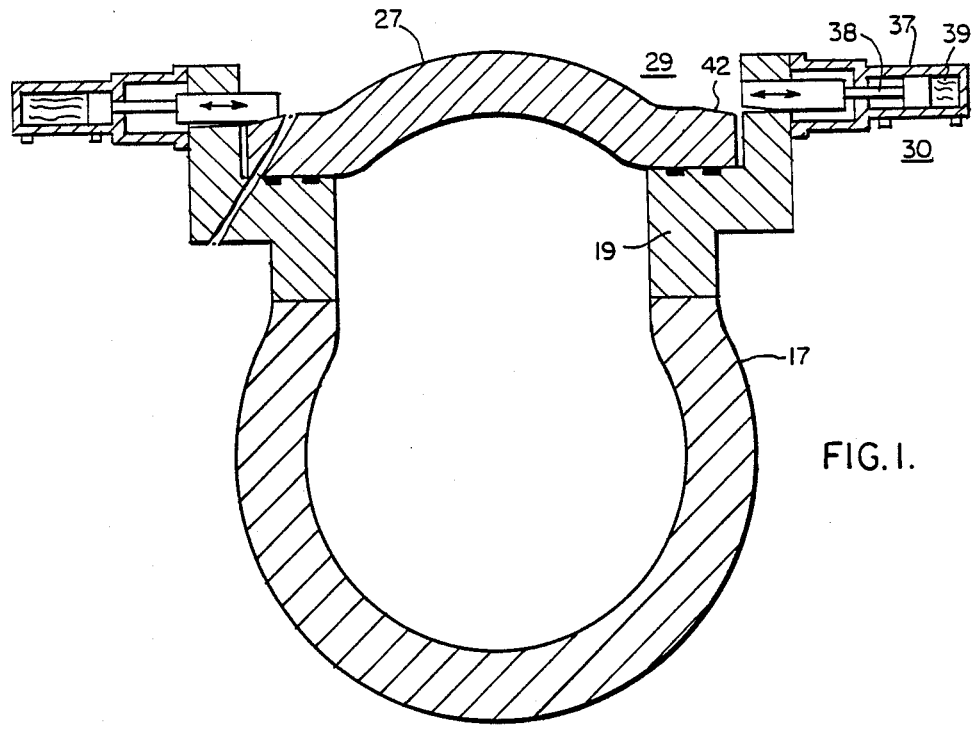
FIG. 1 is a side-elevational view of a vessel head closure according to the present invention.
Figure 2:
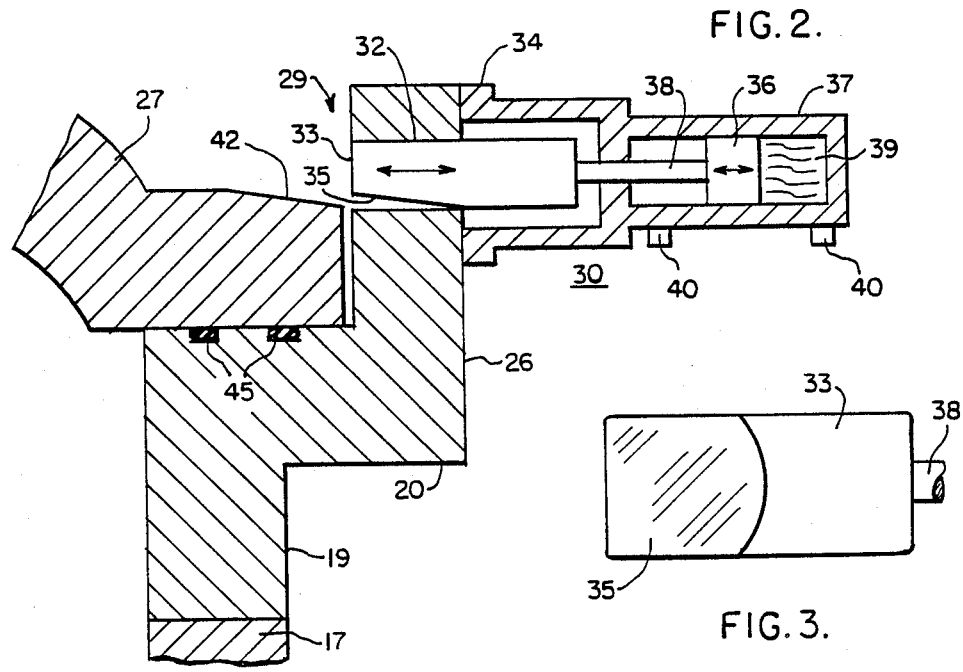
FIG. 2 is an enlarged sectional view of the closure mechanism in FIG. 1.
Figure 3:
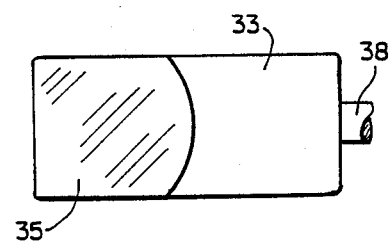
FIG. 3 is an enlarged bottom elevational view of the contoured tapered surface of the sealing member or wedge.

Referring now to the drawings in detail, FIGS. 1, 2 and 3 show a pressure vessel 17 having a nozzle 19 in an upper portion with a port flange 20 extending radially from the nozzle 19 and which has an upper surface 23, a vertically disposed wall 26 extending upwardly from the port flange 20, a vessel head 27, and at least one hydraulically driven, or having other driving means, wedge assembly 30 secured to the port flange 20. The installation of the wedge assemblies 30 is provided for by the addition of the wall portion 26 around the circumference of the port flange 20. The wall 26 is added as an integral part to the port flange 20 by conventional means, such as welding. In this manner, the wall 26 and flange 2T also form a well 29 which serves as a drip pan to prevent the spillage of any fluid within the pressure vessel 17 as the head 27 is lifted. Additionally, the wall 26 has regularly spaced around its circumference a number of holes 32 for the passage of a sealing member or wedge 33 used to seal the head 27 in place. A corresponding wedge assembly 30 is secured to the wall 26 at each of the respective holes 32 by a support member 34.

The wedge assemblies 30 are comprised of a sealing member or wedge 33, having a contoured tapered bottom surface 35, which is rigidly attached to a piston 36 of a hydraulic cylinder 37 by shaft 38. It is to be understood that the hydraulic cylinder 37, piston 36 and shaft 38 may be replaced by any other suitable means for moving the wedge 33 into and out of sliding engagement with the head 27. The tapered surface 35 constitutes about a 3° to 5° incline from the horizontal. The hydraulic cylinder 37 is operated in the conventional manner by the appropriate addition or subtraction of hydraulic fluid 39 under pressure. It should be noted that the wedge assembly 30 shown on the right-hand side of FIG. 1 is in the vessel head releasing position, while that on the left-hand side is shown in the vessel head sealing position. The supply of hydraulic fluid 39 is controlled by a safety feature the operation of which is more fully explained hereinafter.

To securely close the pressure vessel 17, the head 27 is placed within the well 29 formed by the port flange 20 and wall 26. Since there are no bolts used, there is no need to rotationally align the head 27 with respect to the vessel 17, thus saving placement time. When the head 27 has been so positioned, the hydraulic cylinder 37 is actuated by pressurized hydraulic fluid 39, which causes the piston 36 and the attached wedge 33 to move generally, radially inward into sliding contact with the vessel head 27. Limit switches 40 operably associated with wedge assembly 30 provide an indication as to whether the wedge 33 is in the vessel head sealing or releasing position.

The vessel head 27 has a corresponding tapered upper surface 42 which corresponds to the contoured tapered bottom surface 35 of the wedge 33. The interaction of these two tapered interfacing surfaces 40 and 35 of the head 27 and the wedge 33, respectively, facilitates the transfer, as well as an increase, of force from the hydraulic cylinder 37 onto the vessel head seal rings 45. With the appropriate number of wedge assemblies 30 to place the desired preload on the vessel head 27, the seal rings 45 are sufficiently compressed between the head 27 and the upper surface 23 of the port flange 20 to prevent any leakage of fluid from the pressurized vessel 17. Since this is a completely automated device, and all wedge assemblies 30 can be operated simultaneously from a remote location, the vessel head 27 can be securely placed on the pressure vessel 17 within a time period of less than 1 minute.

The number of wedge assemblies 30 is dependent upon the size of the vessel 17 as well as the necessary amount of preload, which is further dependent upon the internal pressure of the vessel 17. For example, for the main working port of one design of a typical anechoic test vessel whose closure head has an internal diameter of about 183 centimeters (72 inches), twelve wedge assemblies 30 can provide a preload on the order of 53 to 62 MN (12 to 14 million pounds) to seal a vessel 17 which has been pressurized to about 21 MPa (3000 psi); whereas a smaller working port whose closure head has an internal diameter of about 91.5 centimeters (36 inches) only require four wedge assemblies 30 to provide an effective seal.

To release the sealing force on the vessel head 27 so as to open the vessel 17 for the placement or removal of testing equipment, the hydraulic fluid 39 is allowed to drain from one portion of the cylinder 37 to release the inward pressure on the piston 36. Simultaneously, the piston 36 is hydraulically forced in a generally, radially outward direction thereby moving the wedge 33 out of engagement with the vessel head 27. The head 27 can then be lifted out of the well 29. Because of the dangers that could arise in the event of opening the vessel 17 while it is still pressurized, for example, damage to equipment or injury to personnel, the system includes two independent safety features which will now be more fully described.

The safety features are incorporated into an electrical and hydraulic control system 50 to prevent the activation of the hydraulically driven wedge assemblies 30 and attempted release of the vessel head 27 while the vessel 17 is still pressurized. As represented by the schematic diagram in FIG. 4, the control system 50 operation is based upon the level of pressure within the pressure vessel 17 as determined by pressure gauge 51. In the first safety feature, a pressure switch 52 prohibits electrical solenoid action within valves 54 when there is any pressure within the vessel 17. These valves 54 are preferably three-position, four-way valves which supply hydraulic fluid 39 to the wedge assembly cylinders 37, of which two are shown. If there is any pressure within the vessel 17, valves 54 are electrically prevented from being positioned so that the hydraulic fluid 39 may be drained from wedge assembly cylinders 37 to fluid reservoirs 53, which would thereby release the preload on the pressure vessel 27. Also, once wedge assembly cylinders 37 have been activated, the valves 54 are blocked closed so that in the event of loss of electrical power, the wedge assembly cylinders 37 will remain in the vessel sealing position.

A second safety feature works directly off the pressure gauge 51, independent of any electrical system, so that hydraulic cylinders 37 can be controlled even if the electrical control system just discussed has been short circuited. A pressure valve 56, which is preferably a two position, two way valve, blocks fluid 39 from operating any wedge assembly cylinders 37 while the vessel 17 is still under pressure. Pressurized water or other fluid 57 from the vessel 17 prevents the valve 56 from being operated so as to prevent hydraulic fluid 39 from inadvertently being drained from cylinders 37 while the vessel 17 is under pressure. Any attempt to operate the pressure relief valve 58, which can also be electrically connected to the pressure switch 52, in order to drain the hydraulic fluid 39 into reservoir 60 while the vessel 17 is still under pressure will be blocked by either or both of these systems.

When it is desired to seal the pressure vessel 17, the hydraulic pump 62 is activated, while the relief valve 58 is closed, to pump hydraulic fluid 39 from the reservoir 60 to wedge assemblies 37. The fluid 39 is pumped under sufficient pressure, as determined by gauge 64, to force wedges 33 over the vessel head 27 as previously described in order to seal the vessel 17 with the required preload.

Figure 4:
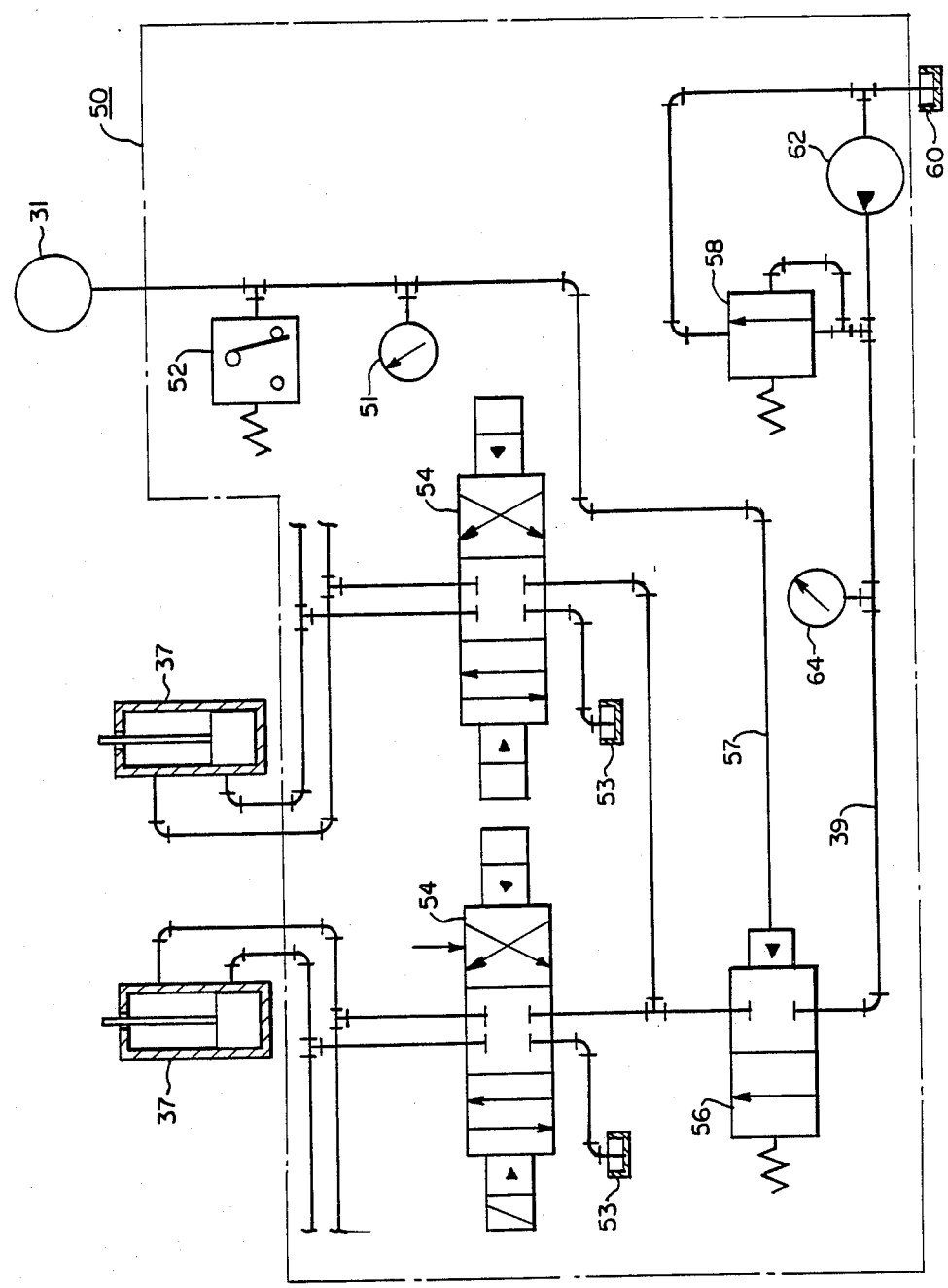
FIG. 4 is a schematic diagram of the control system.

Preferably, the elements which comprise the control system 50, as shown in FIG. 4 (except for the vessel 17, wedge assembly cylinders 37 and reservoirs 53 and 60), are all mounted on a common power unit stand for remote availability and control.

One application for which the closure device of the present invention is most desirable would be on a pressurized testing vessel which requires rapid access to specimens after testing, and rapid insertion of specimens for testing such a vessel, for example, is an anechoic test chamber used to simulate the high pressures encountered deep in the ocean.

If proper precautions are not otherwise taken, opening of the vessel while it is still pressurized would cause a large amount of coolant, as well as specimens or equipment within the pressure vessel, to be expelled therefrom at great force. Such a condition could lead to damage of other components or structures, as well as injury to personnel from the expelled equipment or specimens. Thus the presence of an automatic safety feature which will prevent attempted releasing of the preload on the closure head by withdrawing the tapered wedges out of contact with the correspondingly slanted upper surface of the vessel head while the vessel is still pressurized has great significance.

Secondly, a remotely operative closure system obviates the need for time consuming manual labor to remove the vessel head. Because it is a fully automated system, electrically and hydraulically controlled, it is capable of quick operation. Not only is this important to quickly seal a pressure vessel, but also because it may be a vessel used for test purposes which would be repeatedly open and closed. Hence, more time can effectively be used for the desired testing and experimentation than for sealing and releasing of the vessel head. Therefore, this new closure device is particularly suitable for utilization on a nuclear reactor pressure vessel used for testing purposes.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A closure device for a pressure vessel comprising:
   (a) a circular port flange with an upper surface;
   (b) a vessel head adapted to be positioned on the upper surface of the port flange in sealing engagement with the port flange, said vessel head having a circumferential tapered upper surface slanted downward in a radially outward direction;
   (c) at least one wedge assembly secured to the port flange and having a sealing member disposed to slidably engage the circumferential tapered upper surface of the vessel head, to facilitate said seal;
   (d) means for moving said sealing member into and out of sliding engagement with the vessel head; and
   (e) a control system cooperatively associated with said wedge assemblies and the pressure vessel whereby the vessel head cannot be released when the vessel is pressurized.

2. The closure device of claim 1, wherein the sealing member is movable generally, radially inwardly into a vessel head sealing position and generally, radially outwardly into a vessel head releasing position.

3. The closure device of claim 1, wherein the circumferential tapered upper surface of the vessel head and bottom surface of the sealing member are correspondingly tapered at about 3° to 5° from horizontal.

4. The closure device of claim 1, wherein the means for moving the sealing member comprises a hydraulic cylinder having a piston disposed therein, said piston being operatively connected to the sealing member.

5. The closure device of claim 4, wherein the control system comprises:

(a) at least one hydraulic cylinder operating valve for controlling supply of hydraulic fluid to and from the hydraulic cylinder to move the sealing member; and
(b) a pressure-activated valve hydraulically connected to the hydraulic cylinder operating valve for preventing movement of the sealing member when the vessel is pressurized.

6. The closure device of claim 5, wherein the control system further comprises a pressure-activated switch electrically connected to the hydraulic cylinder operating valve and in fluid communication with the pressure vessel, for controlling electrical operation of the hydraulic cylinder operating valve.

7. The closure device of claim 1, wherein the control system consists of two independent means for preventing the closure device from opening when the pressure vessel is pressurized.

8. A closure device for a pressure vessel having a circular port flange with an upper surface, said closure device comprising:
   (a) a circumferential wall portion affixed to the port flange and defining a well, the wall portion having a plurality of circumferentially spaced holes therethrough;
   (b) a vessel head adapted to be positioned on the upper surface of the port flange in sealing engagement with the port flange, said vessel head having a circumferential tapered upper surface slanted downward in a radially outward direction;
   (c) a plurality of wedge assemblies secured to the port flange adjacent to an area defined by said holes for passage of a wedge therethrough and into sliding engagement with the circumferential tapered upper surface of the vessel head, to facilitate said seal; and
   (d) a means for moving said wedge assemblies.

9. The closure device of claim 8, wherein the means for moving said wedge assemblies comprises a hydraulic cylinder having a piston disposed therein, said piston being operatively connected to the wedge, and a control system operatively connected to the means for moving said wedge assemblies and the pressure vessel, wherein the vessel head cannot be released when the vessel is pressurized.

10. The closure device of claim 8, wherein the wedge is movable generally, radially inwardly into a vessel head sealing position and generally, radially outwardly into a vessel head releasing position.

11. The closure device of claim 8, wherein the circumferential tapered upper surface of the vessel head and the tapered lower surface of the wedge are correspondingly slanted at about 3° to 5° from horizontal.

12. The closure device of claim 9, wherein the control system comprises:
   (a) a hydraulic cylinder operating valve for controlling supply of hydraulic fluid to and from the hydraulic cylinders to move said wedges; and
   (b) a pressure-activated valve hydraulically connected to the hydraulic cylinder operating valve for preventing movement of said wedges when the vessel is pressurized.

13. The closure device of claim 12, wherein the control system further comprises a pressure-activated switch electrically connected to the hydraulic cylinder operating valve and in fluid communication with the pressure vessel, for controlling electrical operation of the hydraulic cylinder operating valves; and a pressure relief valve hydraulically connected to the pressure-activated valve for controlling supply of hydraulic fluid to the pressure-activated valve and electricaly connected to the pressure-activated switch for controlling electrical operation of the pressure relief valve.

14. The closure device of claim 9, wherein the control system consists of two independent means for preventing the closure device from opening when the pressure vessel is pressurized.

15. The closure device of claim 8, wherein the means for moving said wedge assemblies is remotely operative.

16. A high preload quick operating closure device for an anechoic pressurized testing vessel containing a liquid, the vessel having a circular port flange with an upper surface, said closure device comprising:
    (a) a circumferential wall portion affixed to the port flange and defining a well, the wall portion having a plurality of holes for passage of a wedge therethrough;
    (b) a vessel head adapted to be positioned on said upper surface in sealing engagement with the port flange, said vessel head having a circumferential tapered upper surface being slanted downward at about 3° to 5° from horizontal in a radially outward direction, and having a generally flat bottom surface with one or more deformable sealing rings thereon;
    (c) a plurality of hydraulically-driven wedge assemblies secured to the wall portion at an area defined by said holes, said assemblies being comprised of a hydraulic cylinder having a piston operatively disposed therein said piston being connected to said wedge by a shaft, the wedge having a correspondingly tapered bottom surface slidingly engaging the circumferential tapered upper surface of the vessel head and thereby creating a large downward force on the vessel head to facilitate said seal; and
    (d) a remotely operative control system operatively connected to the hydraulically-driven wedge assemblies and in fluid communication with the nuclear reactor pressure vessel, wherein said wedges cannot be moved out of engagement with the vessel head when the vessel is pressurized, the control system further comprising a power unit stand having mounted thereon:
        (i) a hydraulic cylinder operating valve for controlling supply of hydraulic fluid to and from the hydraulically-driven wedge assemblies;
        (ii) a pressure-activated valve hydraulically connected to the hydraulic cylinder operating valve and in fluid communication with the nuclear reactor pressure vessel for preventing movement of said wedges when the vessel is pressurized;
        (iii) a pressure-activated switch electrically connected to the hydraulic cylinder operating valve and in fluid communication with the nuclear reactor pressure vessel, for controlling electrical operation of the hydraulic cylinder operating valve; and
        (iv) a pressure relief valve hydraulically connected to the pressure-activated valve and electrically connected to the pressureactivated switch, for controlling supply of hydraulic fluid to the pressure-activated valve.

* * * * *